Aug. 15, 1950            G. E. CUTTAT            2,519,026
ADJUSTMENT DEVICE FOR FEMALE CLUTCH CONES IN COUPLING
FOR DRIVE IN AUTOMATIC LATHES
Filed Dec. 28, 1946

INVENTOR
Georges Emile Cuttat
By Robert E Burns
ATTORNEY

Patented Aug. 15, 1950　　　　　　　　　　　　　　2,519,026

UNITED STATES PATENT OFFICE 2,519,026

ADJUSTMENT DEVICE FOR FEMALE CLUTCH CONES IN COUPLING FOR DRIVE IN AUTOMATIC LATHES

Georges Emile Cuttat, Geneva, Switzerland, assignor to Manufacture de Machines du Haut-Rhin, Haut-Rhin, France, a company of France Application December 28, 1946, Serial No. 719,086
In France November 22, 1941

Section 1, Public Law 690, August 8, 1946
Patent expires November 22, 1961

1 Claim. (Cl. 192—111)

It is known that in automatic lathes, numerous couplings for reversing the direction of the drive are constituted, on one hand, by a double male cone capable of sliding, without turning on the shaft to be driven, and, on the other hand, by two female cones mounted free on this same shaft, on both sides of the double male cone, these female cones receiving rotation motions in opposed directions, by a chain or belt drive for instance. An appropriate organ makes it possible to bring the double male cone in gear now with one of the female cones, then with the other one.

The object of the present invention is an adjustment device for these female clutch cones, characterized by the fact that, a sheath, carrying the female cone, by means of flutings, can slide longitudinally on a nave associated with the driving organ of each female cone.

This sheath may have, externally, a thread engaging the thread of a ring provided with a thread in the opposite direction, engaging an external thread of the nave, the rotation of said ring causing the sheath to slide longitudinally, which makes it possible to bring the female cone closer to or farther away from the male cone.

This arrangement may also be characterized by the fact that the sheath has, on its periphery, a series of notches capable of being entered by a latch sliding inside the ring and which can assume, with respect to this ring two well defined positions, one in which the latch is engaged in one of the notches and another in which the latch, being effaced, allows the rotation of the ring with respect to the sheath.

In the appended drawing, showing, by way of example, a device in accordance with the present invention:

Figure 1:
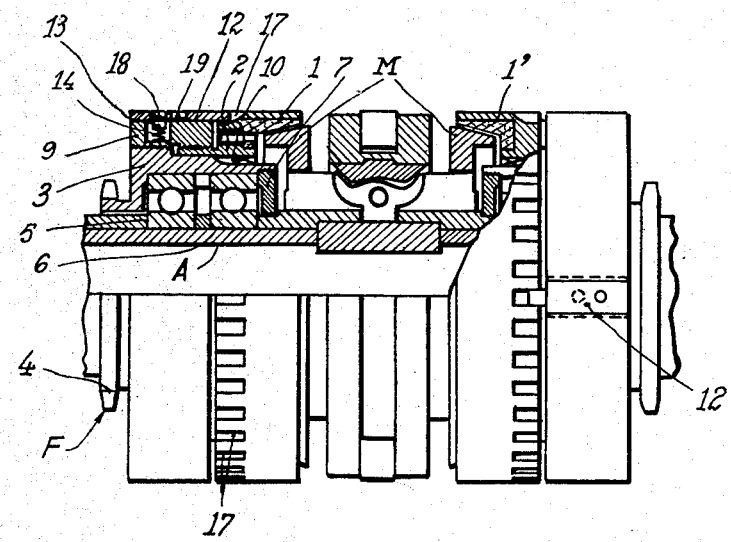
Figure 1 is a side elevation, partly in cross section.
Figure 2:
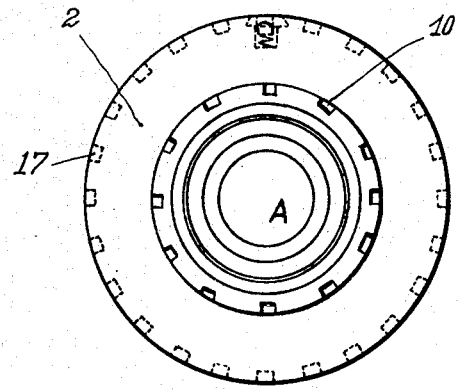
Figure 2 is an end view showing the notches of the sheath.

The whole apparatus comprises double male cone M keyed on shaft A and capable of sliding thereon without turning, either to the right or to the left.

The two female cones 1, 1' cooperate with the double male cones. In the following, the driving device for one of the female cones has alone been represented, the other device being exactly symmetrical with respect to the double male cone. Female cone 1, provided with a packing, is mounted inside a sheath 2. This sheath slides without turning, owing to splines or flutings 10, on a nave 3, associated with pinion 4 of the driving chain. This nave contains bearings having a deep gorge, 5, 6, kept in position by nut 7. These ball bearings with a deep gorge can absorb axial stresses due to the engaging of the friction cones as well as radial stresses.

Externally, a ring 9, with a double thread of reversed pitch is engaged, on one hand, through one of the threads, with the outer part of nave 3, and, on the other hand, through the other thread, with an appendage of sheath 2. It is clear that by rotating ring 9, sheath 2 will be caused to move forward or backward (its rotation being prevented by flutings 10), and, consequently, the position of female cone 1 will be adjusted, and, therefore, the force of friction between this female cone and the male cone.

Besides, sheath 2 is provided with a series of notches 17, which can engage the end of a small latch in the shape of a slide block 12, mounted in a groove of ring 9. This slide block offers two recesses 18, 19, which can be entered by a small piston 13 under the action of a spring 14. Two positions are thus determined for the slide block inside its groove: a rear position and a front position. It is clear that, in order to effect the adjustment, slide block 12 is effaced towards the rear, and brought back inside a notch 17 once the adjustment is finished. The slide block prevents any unscrewing of the ring with respect to the sheath. However, it is independent of any stress due to the rotation of the shaft and, therefore, cannot be thrown out of adjustment.

What I claim is:

In a device for the adjustment of the female clutch cones in couplings for reversing the direction of the drive in automatic lathes, the combination of a shaft, a male friction cone axially slidably but non-rotatably mounted on said shaft, a substantially cylindrical driving member rotatably but axially non-slidably mounted on said shaft adjacent the male cone, said driving member having an externally threaded portion at its outer end, away from the male cone, a splined portion at its inner end and a cylindrical non-threaded portion intermediate said threaded portion and said splined portion, the external diameter of the threaded portion being slightly greater than that of the non-threaded portion, a carrier member comprising a cylindrical sleeve portion closely surrounding the non-threaded portion of the driving member and having its outer end, away from the male cone, externally threaded with threads of reverse pitch to those of the threaded portion of the driving member, and a larger sleeve portion integral with the first and disposed between said first portion and the male cone, said second portion having a substantially greater diameter than the externally threaded portion of the said first portion and having around the outer periphery of its outer end a circular series of axially extending notches, the inner end of said larger sleeve portion of the carrier having an annular recess of greater internal diameter than the external diameter of said first sleeve portion, a female friction cone in said recess and adapted to cooperate with said male cone, the carrier member having intermediate its ends an internally splined portion engaging the splined portion of the driving member, a ring member having an external diameter approximately equal to that of the larger portion of the carrier member and having two internally threaded portions engaging respectively the threads on the outer end of the driving member and the threads on the outer end of the smaller sleeve portion of the carrier, and a latch axially slidable in said ring member and adapted to engage in one of said notches.

GEORGES EMILE CUTTAT.

REFERENCES CITED

The following references are of record in the file of this patent:

UNITED STATES PATENTS

| Number | Name | Date |
|---|---|---|
| 1,607,924 | Shafer, Jr. | Nov. 23, 1926 |
| 2,256,789 | Pegard | Sept. 23, 1941 |
| 2,409,013 | Bodmer | Oct. 8, 1946 |

FOREIGN PATENTS

| Number | Country | Date |
|---|---|---|
| 361,803 | Great Britain | Nov. 26, 1931 |